(12) United States Patent
Fukae et al.

(10) Patent No.: US 11,225,412 B2
(45) Date of Patent: Jan. 18, 2022

(54) TITANIUM CARBONITRIDE POWDER AND METHOD FOR MANUFACTURING TITANIUM CARBONITRIDE POWDER

(71) Applicant: SUMITOMO ELECTRIC INDUSTRIES, LTD., Osaka (JP)

(72) Inventors: Kosuke Fukae, Itami (JP); Masato Michiuchi, Itami (JP); Keiichi Tsuda, Itami (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 368 days.

(21) Appl. No.: 16/324,922

(22) PCT Filed: Jul. 31, 2017

(86) PCT No.: PCT/JP2017/027779
§ 371 (c)(1),
(2) Date: Feb. 12, 2019

(87) PCT Pub. No.: WO2018/037846
PCT Pub. Date: Mar. 1, 2018

(65) Prior Publication Data
US 2021/0061660 A1 Mar. 4, 2021

(30) Foreign Application Priority Data
Aug. 22, 2016 (JP) .............................. JP2016-161986

(51) Int. Cl.
*C01B 21/082* (2006.01)
*C09K 3/14* (2006.01)

(52) U.S. Cl.
CPC ........ *C01B 21/0828* (2013.01); *C09K 3/1418* (2013.01); *C01P 2002/74* (2013.01); *C01P 2004/03* (2013.01); *C01P 2004/52* (2013.01); *C01P 2004/61* (2013.01)

(58) Field of Classification Search
CPC ................... C01P 2004/51–52; C01B 21/0828
See application file for complete search history.

(56) References Cited

U.S. PATENT DOCUMENTS 5,597,543 A * 1/1997 Zeiringer ............ C01B 21/0602
423/380

FOREIGN PATENT DOCUMENTS

| EP | 0693456 A1 | 1/1996 |
| JP | H06-166505 A | 6/1994 |
| JP | H08-333107 A | 12/1996 |
| JP | 2002-60802 A | 2/2002 |
| JP | 2003-27114 A | 1/2003 |
| JP | 2003-137654 A | 5/2003 |
| JP | 2011-132057 A | 7/2011 |

* cited by examiner

*Primary Examiner* — Alexandre F Ferre
(74) *Attorney, Agent, or Firm* — Faegre Drinker Biddle & Reath LLP

(57) ABSTRACT

A titanium carbonitride powder for use as a starting material for a hard material satisfies a D50 of from 2.0 μm to 6.0 μm and a D10/D90 of from 0.20 to 0.50, wherein D50 is a particle size at a cumulative percentage of 50% of a particle size distribution by volume, D10 is a particle size at a cumulative percentage of 10% of the particle size distribution by volume, and D90 is a particle size at a cumulative percentage of 90% of the particle size distribution by volume.

5 Claims, 8 Drawing Sheets

Sample No. 1-1

1 μm

Sample No. 1-1

1 μm

Sample No. 1-11

1 μm

Sample No. 1-12

1 μm

Sample No. 1-1

0.2 μm

Sample No. 1-11

0.2 μm

Sample No. 2-1

1 μm

Sample No. 2-11

1 μm

Sample No. 2-12

1 μm

TITANIUM CARBONITRIDE POWDER AND METHOD FOR MANUFACTURING TITANIUM CARBONITRIDE POWDER

TECHNICAL FIELD

The present invention relates to titanium carbonitride powders and methods for manufacturing titanium carbonitride powders.

This application claims priority to Japanese Patent Application No. 2016-161986, filed Aug. 22, 2016, the entire contents of which are incorporated herein by reference.

BACKGROUND ART

PTL 1 discloses a titanium carbonitride powder as a starting material for a cutting tool (hard material). As a method for manufacturing this titanium carbonitride powder, PTL 1 discloses that titanium hydride and carbon powder are provided as starting materials, are mixed and pulverized in a ball mill, and are heat-treated at a temperature of 1,400° C. to 1,700° C. in a nitrogen-containing atmosphere, followed by pulverization to an average particle size of 3 µm or less (in the test examples, 1.5 pin or less).

CITATION LIST

Patent Literature

PTL 1: Japanese Unexamined Patent Application Publication No. 2002-60802

SUMMARY OF INVENTION

A titanium carbonitride powder according to the present disclosure is a titanium carbonitride powder for use as a starting material for a hard material, the titanium carbonitride powder satisfying:

a D50 of from 2.0 µm to 6.0 µm; and
a D10/D90 of from 0.20 to 0.50, wherein D50 is a particle size at a cumulative percentage of 50% of a particle size distribution by volume, D10 is a particle size at a cumulative percentage of 10% of the particle size distribution by volume, and D90 is a particle size at a cumulative percentage of 90% of the particle size distribution by volume.

A method for manufacturing a titanium carbonitride powder according to the present disclosure includes:

a providing step of providing starting powders including titanium oxide powder and carbon powder;

a mixing step of mixing the starting powders without pulverization to obtain a mixed powder; and a heat treatment step of heating the mixed powder in a nitrogen-containing atmosphere at a temperature of from higher than 2,000° C. to 2,500° C. to obtain a titanium carbonitride powder.

DESCRIPTION OF EMBODIMENTS

Problems to be Solved by Disclosure

Figure 1:
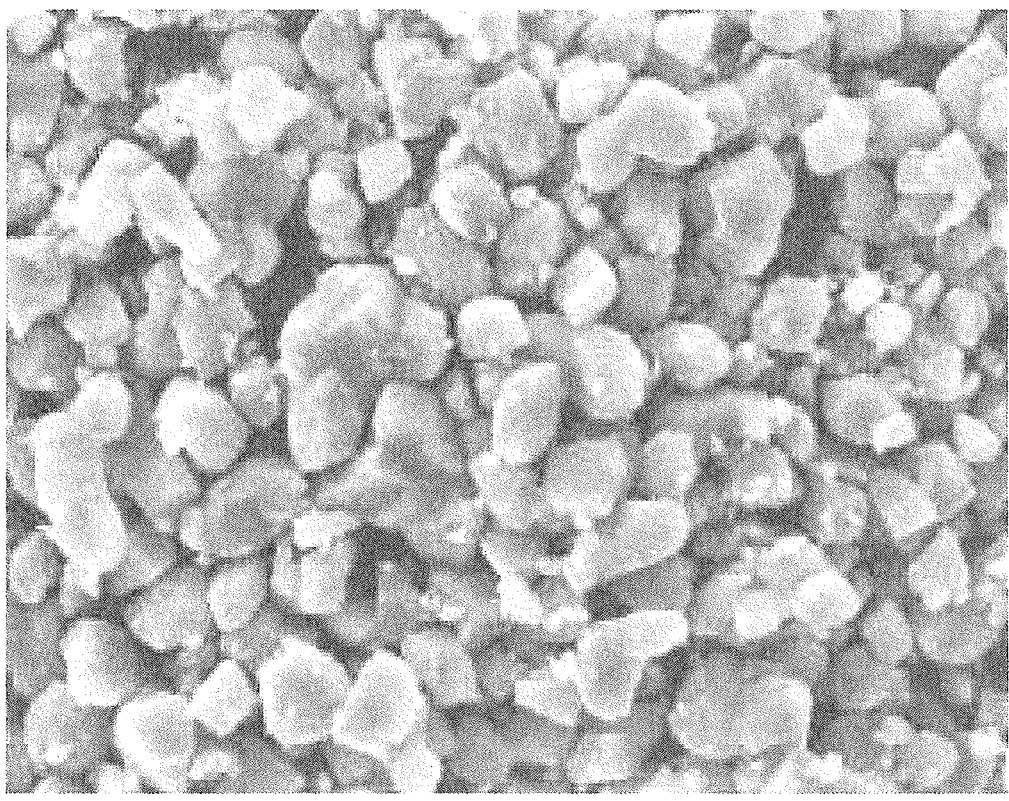
FIG. 1 is a field-emission scanning electron micrograph of a titanium carbonitride powder of Sample No. 1-1 in Test Example 1.

Recently, cutting tools have been used under severe conditions because, for example, workpieces have become increasingly difficult to cut in cutting processes and have also been machined into more complicated shapes. Accordingly, there is a need for a hard material with a higher fracture toughness and thermal conductivity.

Since the titanium carbonitride powder disclosed in PTL 1 has a relatively small average particle size, a hard material manufactured using this powder as a starting material has superior hardness; however, it tends to exhibit decreased fracture toughness. In addition, this titanium carbonitride powder tends to have variations in the particle size of the powder because mixing is performed with pulverization. If there are variations in the particle size of the powder, dissolution and reprecipitation tend to occur during the process of manufacturing the hard material. This tends to promote the growth of a surrounding structure formed of a solid solution of titanium carbonitride and carbides added as minor constituents (e.g., tungsten carbide and niobium carbide). This overgrown surrounding structure tends to result in decreased thermal conductivity.

Accordingly, an object of the present disclosure is to provide a titanium carbonitride powder suitable for use as a starting material for a hard material with superior fracture toughness and thermal conductivity. Another object of the present disclosure is to provide a method for manufacturing a titanium carbonitride powder suitable for use as a starting material for a hard material with superior fracture toughness and thermal conductivity.

Advantageous Effects of Disclosure

According to the present disclosure, a titanium carbonitride powder suitable for use as a starting material for a hard material with superior fracture toughness and thermal conductivity can be provided. According to the present disclosure, a method for manufacturing a titanium carbonitride powder suitable for use as a starting material for a hard material with superior fracture toughness and thermal conductivity can also be provided.

Description of Embodiments of Invention

First, a list of embodiments of the present invention will be described.

(1) A titanium carbonitride powder according to an embodiment of the present invention is a titanium carbonitride powder for use as a starting material for a hard material, the titanium carbonitride powder satisfying:

a D50 of from 2.0 μm to 6.0 μm; and
a D10/D90 of from 0.20 to 0.50, wherein D50 is the particle size at a cumulative percentage of 50% of a particle size distribution by volume, D10 is the particle size at a cumulative percentage of 10% of the particle size distribution by volume, and D90 is the particle size at a cumulative percentage of 90% of the particle size distribution by volume.

The titanium carbonitride powder is coarse since it satisfies a D50 of from 2.0 μm to 6.0 μm, and is also uniformly sized since it satisfies a D10/D90 of from 0.20 to 0.50. Since the titanium carbonitride powder is coarse and uniformly sized, a hard material manufactured using this powder as a starting material has superior fracture toughness and thermal conductivity.

Since the titanium carbonitride powder has a D50 of 2.0 μm or more, a hard material manufactured using this powder as a starting material includes a coarse hard phase, which improves the fracture toughness by a crack-propagation inhibiting effect (crack deflection effect). On the other hand, since the titanium carbonitride powder has a D50 of 6.0 μm or less, sufficient sinterability can be ensured during the manufacture of the hard material.

Since the titanium carbonitride powder has a D10/D90 of 0.20 or more, excessive pulverization need not be performed when a hard material is manufactured using this powder as a starting material. Excessive pulverization forms a finely pulverized titanium carbonitride powder, which tends to undergo Ostwald ripening (dissolution and reprecipitation phenomenon) during liquid-phase sintering and thus tends to form a solid solution of titanium carbonitride and carbides added as minor constituents (e.g., tungsten carbide and niobium carbide). This solid solution tends to decrease the thermal conductivity as a result of phonon scattering. Since the formation of fine powder and the formation of a solid solution due to the presence of fine powder can be inhibited, the thermal conductivity of a hard material manufactured using the titanium carbonitride powder as a starting material can be improved. On the other hand, since the titanium carbonitride powder has a D10/D90 of 0.50 or less, sufficient sinterability can be ensured during the manufacture of the hard material.

(2) As an example of the titanium carbonitride powder, the titanium carbonitride powder may satisfy a D50 of from 2.5 μm to 3.5 μm.

If the titanium carbonitride powder further satisfies a D50 of from 2.5 μm to 3.5 μm, the fracture toughness of the hard material can be further improved while sufficient sinterability is ensured during the manufacture of the hard material.

(3) As an example of the titanium carbonitride powder, all X-ray diffraction peaks of (2,0,0), (2,2,0), and (2,2,2) planes as measured with Cu Kα X-rays may have a full width at half maximum of from 0.03° to 0.20°.

The crystallinity of titanium carbonitride can be determined from the full width at half maximum of an X-ray diffraction peak. As the full width at half maximum becomes smaller, the crystallinity becomes higher. If all peaks of the above planes of the titanium carbonitride satisfy a full width at half maximum of from 0.03° to 0.20°, the mechanical strength of a hard material manufactured using this powder as a starting material can be improved because of its high crystallinity.

(4) As an example of the titanium carbonitride powder, each titanium carbonitride particle forming the titanium carbonitride powder may contain two or fewer pores.

If the titanium carbonitride particles contain two or fewer pores, the mechanical strength of a hard material manufactured using the titanium carbonitride powder composed of these titanium carbonitride particles as a starting material can be improved.

(5) A method for manufacturing a titanium carbonitride powder according to an embodiment of the present invention includes:

a providing step of providing starting powders including titanium oxide powder and carbon powder;
a mixing step of mixing the starting powders without pulverization to obtain a mixed powder; and
a heat treatment step of heating the mixed powder in a nitrogen-containing atmosphere at a temperature of from higher than 2,000° C. to 2,500° C. to obtain a titanium carbonitride powder.

If the starting powders are mixed without pulverization in the mixing step of the method for manufacturing a titanium carbonitride powder, the particle size of the starting powders remains substantially the same before and after mixing, and the heat treatment step can be performed while the uniform particle size of the starting powders is maintained, so that the resulting titanium carbonitride powder is uniformly sized. If heating is performed at a temperature of from higher than 2,000° C. to 2,500° C. in the heat treatment step of the method for manufacturing a titanium carbonitride powder, the grain growth of the powder can be promoted, so that the resulting titanium carbonitride powder is coarse.

(6) As an example of the method for manufacturing a titanium carbonitride powder, the method may include, after the mixing step and before the heat treatment step, a granulation step of granulating and sizing the mixed powder to obtain a granulated powder,
in the heat treatment step, the granulated powder may be heated to obtain a granulated powder of titanium carbonitride, and
the method may further include a de-agglomeration step of disintegrating the granulated powder of titanium carbonitride.

The granulation of the mixed powder before the heat treatment step improves the handleability of the powder. Granulation also reduces variations in the quality of the powder after the heat treatment step.

Details of Embodiments of Invention

Details of embodiments of the present invention will hereinafter be described. It should be understood that the invention is not limited to these examples, but is indicated by the claims, and all changes that come within the meaning and range of equivalency of the claims are intended to be embraced therein.

[Titanium Carbonitride Powder]

A titanium carbonitride powder according to an embodiment is a powder for use as a starting material for a hard material. One of the features of the titanium carbonitride powder is that it is coarse and uniformly sized. The titanium carbonitride powder satisfies a D50 of from 2.0 μm to 6.0 μm (i.e., coarse) and a D10/D90 of from 0.20 to 0.50 (i.e., uniformly sized), wherein D50 is the particle size at a cumulative percentage of 50% of a particle size distribution by volume, D10 is the particle size at a cumulative percentage of 10% of the particle size distribution by volume, and D90 is the particle size at a cumulative percentage of 90% of the particle size distribution by volume. D50, D10, and D90 can be measured with a commercially available particle size distribution analyzer (laser diffraction/scattering particle size distribution analyzer).

Since the titanium carbonitride powder has a D50 of 2.0 µm or more, a hard material manufactured using this powder as a starting material includes a coarse hard phase, which improves the fracture toughness by a crack-propagation inhibiting effect (crack deflection effect). As the D50 of the titanium carbonitride powder becomes larger, the hard phase in the resulting hard material becomes coarser; however, the sinterability during the process of manufacturing the hard material would be adversely affected. Thus, the titanium carbonitride powder has a D50 of 6.0 µm or less so that sufficient sinterability can be ensured during the manufacture of the hard material. The titanium carbonitride powder preferably has a D50 of from 2.1 µm to 4.0 µm, or from 2.4 µm to 3.7 µm, particularly from 2.5 µm to 3.5 µm.

Since the titanium carbonitride powder has a D10/D90 of 0.20 or more, its particle size distribution is narrow and sharp, and excessive pulverization need not be performed during the process of manufacturing a hard material using this powder as a starting material, so that dissolution and reprecipitation that can occur during sintering can be inhibited. Therefore, a hard material manufactured using this powder as a starting material includes a uniformly sized hard phase, which inhibits the growth of a surrounding structure surrounding the hard phase (a solid solution of titanium carbonitride and carbides added as minor constituents (e.g., tungsten carbide and niobium carbide)) and thus improves the thermal conductivity. On the other hand, since the titanium carbonitride powder has a D10/D90 of 0.50 or less, sufficient sinterability can be ensured during the manufacture of the hard material. The titanium carbonitride powder preferably has a D10/D90 of from 0.22 to 0.45, or from 0.23 to 0.40, particularly from 0.24 to 0.40.

The titanium carbonitride powder preferably shows an X-ray diffraction peak with a small full width at half maximum as measured with Cu Kα X-rays. The crystallinity of titanium carbonitride can be determined, for example, from the full width at half maximum. As the crystallinity of titanium carbonitride becomes higher, that is, as the crystal structure of titanium carbonitride contains fewer defects, its peak tends to have a smaller full width at half maximum and become sharper. As the crystallinity of titanium carbonitride becomes higher, the mechanical strength of a hard material manufactured using this powder as a starting material can be improved.

It is preferred that all peaks of the (2,0,0), (2,2,0), and (2,2,2) planes of the titanium carbonitride powder have a full width at half maximum of from 0.03° to 0.20°. If all these peaks satisfy a full width at half maximum of from 0.03° to 0.20°, a hard material with superior titanium carbonitride crystallinity and therefore superior mechanical strength can be obtained. The peak of the (2,0,0) plane preferably has a full width at half maximum of from 0.06° to 0.16°, particularly from 0.09° to 0.12°. The peak of the (2,2,0) plane preferably has a full width at half maximum of from 0.06° to 0.16°, particularly from 0.09° to 0.12°. The peak of the (2,2,2) plane preferably has a full width at half maximum of from 0.05° to 0.13°, particularly from 0.07° to 0.11°.

Each titanium carbonitride particle forming the titanium carbonitride powder preferably contains fewer pores. As the titanium carbonitride particles contain fewer pores, that is, as the titanium carbonitride particles contain fewer defects and have a higher density, the mechanical strength of a hard material manufactured using the titanium carbonitride powder composed of these titanium carbonitride particles as a starting material can be improved.

The titanium carbonitride particles preferably contain two or fewer pores, or one or fewer pores, particularly substantially no pores. The number of pores in the titanium carbonitride particles can be measured by preparing a test specimen containing the titanium carbonitride powder, ion-polishing the test specimen with an ion slicer (manufactured by JEOL Ltd.), and observing the resulting cross-section under a field-emission transmission electron microscope (FE-TEM). Specifically, the pore measurement is performed in three to five observation fields of view taken from the cross-section, each field of view having an area of from 4 µm² to 8 µm². The measurement is preferably performed on a total of three or more titanium carbonitride particles. For example, for FE-TEM observation images, the measurement may be performed on one titanium carbonitride particle per field of view. The number of pores is measured by visual observation of acquired high-angle annular dark field (HAADF) images. The number of pores is determined to be zero if no pore is visually observed in images captured under an FE-TEM at 50,000× magnification in three or more fields of view, each field of view having an area of 4 µm² or more. If there is a plurality of pores overlapping each other, this cluster of overlapping pores is determined to be one pore. The pores may have a circle equivalent diameter (the diameter of a circle having the same area as the cross-section of a pore) of 0.01 µm or more.

[Method for Manufacturing Titanium Carbonitride Powder]

A method for manufacturing the titanium carbonitride powder according to the embodiment includes a providing step of providing starting powders, a mixing step of mixing the starting powders to obtain a mixed powder, a granulation step of granulating the mixed powder to obtain a granulated powder, a heat treatment step of heat-treating the granulated powder to obtain a titanium carbonitride powder (granules), and a de-agglomeration step of disintegrating the heat-treated granulated powder to obtain a titanium carbonitride powder (particles). The individual steps will hereinafter be described in detail.

<<Providing Step>>

The providing step is a step of providing starting powders including titanium oxide powder and carbon powder. The use of uniformly sized starting powders tends to provide a uniformly sized powder after the heat treatment step described later.

The titanium oxide powder may have any crystal structure, such as anatase or rutile, and commercially available products can be used. The titanium oxide powder may have an average particle size of from 0.1 µm to 1 µm. The average particle size of the starting powders refers to the average particle size determined by the Fisher Sub-Sieve Sizer (FSSS) method (FSSS size). If the titanium oxide powder has an average particle size of 1 µm or less, the contact area of the titanium oxide powder with the carbon powder can be increased, thus allowing a reduction and nitridation reaction to proceed quickly in the heat treatment step described later. On the other hand, if the titanium oxide powder has an average particle size of 0.1 µM or more, the starting powder is easy to handle. The titanium oxide powder may have an average particle size of from 0.3 µm to 0.7 µm, particularly from 0.45 µm to 0.6 µm.

As the carbon powder, amorphous carbon (e.g., charcoal, soot, or coke) can be used. The carbon powder may have an average particle size of 1 µm or less. If the carbon powder has an average particle size of 1 µm or less, the contact area of the titanium oxide powder with the carbon powder can be increased, thus allowing a reduction and nitridation reaction to proceed quickly in the heat treatment step described later.

The mixing ratio of the titanium oxide powder to the carbon powder can be appropriately selected depending on the carbon-to-nitrogen ratio of the titanium carbonitride powder obtained in the heat treatment step described later. For example, the mixing ratio of the titanium oxide powder to the carbon powder may be, by mass, 74.3:25.7 to 71.1:28.9, or 73.5:26.5 to 71.9:28.1, particularly 73.1:26.9 to 72.3:27.7.

<<Mixing Step>>

The mixing step is a step of mixing the starting powders provided in the providing step substantially without pulverization to obtain a mixed powder. One of the features of the method for manufacturing the titanium carbonitride powder according to the embodiment is that the starting powders are mixed under mixing conditions where the starting powders are not pulverized. If the starting powders are mixed without pulverization, the particle size of the starting powders remains substantially the same before and after mixing, and the heat treatment step described later can be performed while the uniform particle size of the starting powders is maintained. Examples of machines for use in the mixing step include dry airflow mixers with impellers, ultrasonic wet mixers, and vortex wet mixers. For example, machines such as Henschel mixers and attritors can be used. If a Henschel mixer is used, example mixing conditions are as follows: rotational speed=from 1,200 rpm to 1,800 rpm; mixing time=from 30 minutes to 90 minutes.

<<Granulation Step>>

The granulation step is a step of granulating and sizing the mixed powder obtained in the mixing step to obtain a granulated powder. Known granulation processes using machines such as tableting machines and extrusion granulators can be employed for granulation. Granulation improves the handleability of the powder and also reduces variations in the quality of the powder after the heat treatment step described later. The granulation binder may be any binder, such as dextrin. The granulated powder may have any shape, such as a sphere with a diameter of about 3 mm to 5 mm, a cylinder with a diameter of about 1 mm to 2 mm and a length of about 2 mm to 5 mm, or a tablet with a diameter of about 1 mm to 5 mm and a height of about 1 mm to 2 mm. If the granulated powder is excessively large in size, the center of the granulated powder may remain unreacted after the heat treatment step described later; therefore, the granulated powder should have a size that allows it to be nitrided to the center thereof. Granulation and sizing are followed by drying (at about 150° C.).

<<Heat Treatment Step>>

The heat treatment step is a step of heating the granulated powder obtained in the granulation step in a nitrogen-containing atmosphere to obtain a titanium carbonitride powder (granules). One of the features of the method for manufacturing the titanium carbonitride powder according to the embodiment is that the heat treatment temperature is from higher than 2,000° C. to 2,500° C. If the heat treatment temperature is higher than 2,000° C., the grain growth of the powder can be promoted, so that a coarse titanium carbonitride powder can be obtained. On the other hand, if the heat treatment temperature is 2,500° C. or lower, excessive grain growth can be inhibited, thus ensuring sufficient sinterability during the manufacture of the hard material. The heat treatment temperature is preferably from 2,050° C. to 2,400° C., particularly from 2,150° C. to 2,300° C.

The heating rate from room temperature to the heat treatment temperature may be 5° C./min or higher. If the heating rate is 5° C./min or higher, the time for grain growth is shortened, thus inhibiting abnormal grain growth. The heating rate to the heat treatment temperature is preferably 10° C./min or higher, particularly 15° C./min or higher.

The heat treatment time may be from 0.5 hours to 2.0 hours. If the heat treatment time is 0.5 hours or more, the grain growth of the powder tends to be promoted, so that a coarse titanium carbonitride powder can be obtained. On the other hand, if the heat treatment time is 2.0 hours or less, the aggregation of the powder tends to be inhibited. The heat treatment time is preferably from 0.6 hours to 1.5 hours, particularly from 0.75 hours to 1.25 hours.

The heat treatment atmosphere is a nitrogen-containing atmosphere, such as a single atmosphere of nitrogen ($N_2$) alone, an ammonia ($NH_3$) atmosphere, or a mixed gas atmosphere of a nitrogen-containing gas such as nitrogen ($N_2$) or ammonia with an inert gas such as Ar.

The heat treatment furnace used for heat treatment may be, for example, a batch vacuum atmosphere furnace or a continuous rotary kiln furnace.

Heating at the heat treatment temperature may be followed by cooling to room temperature, for example, at a cooling rate of from 5° C./min to 40° C./min.

<<De-Agglomeration Step>>

The titanium carbonitride powder obtained in the heat treatment step is in granular form. These granules can be disintegrated, for example, in a mortar by hand, to obtain a particulate titanium carbonitride powder.

In the method for manufacturing the titanium carbonitride powder described above, the granulation step and the de-agglomeration step can be omitted. In this case, the mixed powder obtained in the mixing step may be heated in the heat treatment step. The de-agglomeration step need not be performed since the titanium carbonitride powder obtained after the heat treatment step is in particulate form.

The titanium carbonitride powder described above is suitable for use as, for example, a starting material for a hard material for cutting tools requiring fracture resistance and thermal shock resistance, such as cermet for milling cutters.

[Method for Manufacturing Hard Material]

Typically, a hard material can be manufactured through the steps of providing starting powders, mixing, compaction, and sintering. The titanium carbonitride powder according to the embodiment described above is used as a starting powder. This provides a hard material including a coarse and uniformly sized hard phase containing titanium carbonitride as a major constituent (first hard phase).

<<Providing Step>>

The providing step is a step of providing a hard phase powder and a binder phase powder. As the hard phase powder, the titanium carbonitride powder according to the embodiment described above (first hard phase powder) is provided. As optional hard phase powders, powders of carbides, nitrides, carbonitrides, and solid solutions thereof containing one or more metal elements selected from elements in groups 4, 5, and 6 of the periodic table excluding Ti (second hard phase powder) are also provided. The second hard phase powder may be, for example, tungsten carbide (WC) powder, tantalum carbide (TaC) powder, niobium carbide (NbC) powder, vanadium carbide (VC) powder, trichromium dicarbide ($Cr_3C_2$) powder, dimolybdenum carbide ($Mo_2C$) powder, or zirconium carbonitride (ZrCN) powder. As the binder phase powder, an iron group metal powder is provided.

<<Mixing Step>>

The mixing step is a step of mixing the starting powders provided in the providing step. In the mixing step, the starting powders provided in the providing step, particularly the titanium carbonitride powder, are mixed substantially without pulverization. If the starting powders are mixed without pulverization, the particle size of the starting powders remains substantially the same before and after mixing, and the sintering step described later can be performed while the uniform particle size of the starting powders is maintained. Known machines can be used for the mixing step. For example, machines such as attritors, tumbling ball mills, and bead mills can be used. As the mixing conditions, either wet mixing or dry mixing may be employed. Mixing may be performed in a solvent such as water, ethanol, acetone, or isopropyl alcohol.

<<Compaction Step>>

The compaction step is a step of compacting the mixed powder obtained in the mixing step into a predetermined shape to obtain a compact. Any common compaction process and any common compaction conditions may be employed for the compaction step. The predetermined shape may be, for example, a cutting tool shape.

<<Sintering Step>>

The sintering step is a step of sintering the compact obtained in the compaction step to obtain a sintered body. Sintering may be performed at a temperature of from 1,400° C. to 1,600° C. for a period of time of from 0.25 hours to 1.5 hours. The sintering atmosphere may be any atmosphere, such as a $N_2$ gas atmosphere, an inert gas atmosphere such as Ar, or a vacuum atmosphere.

[Hard Material]

A hard material obtained by the method for manufacturing a hard material described above is composed of a hard phase, a binder phase that binds the hard phase, and incidental impurities. The incidental impurities may be oxygen and metal elements in concentrations on the order of ppm that are contained in the starting materials or are mixed during the manufacturing process.

The hard phase includes a first hard phase containing titanium carbonitride as a major constituent. The hard phase optionally includes a second hard phase different from the first hard phase. Since this hard material is manufactured using the titanium carbonitride powder according to the embodiment described above as a starting material, the first hard phase is coarse and uniformly sized. The composition of each hard phase can be easily determined by observing a surface or cross-section of the hard material under a light microscope or by subjecting a surface or cross-section of the hard material to image analysis by scanning electron microscopy (SEM) and energy-dispersive X-ray spectrometry (EDS) (EDS area analysis).

TEST EXAMPLES

Test Example 1

In Test Example 1, titanium carbonitride powders (Sample Nos. 1-1 to 1-5, 1-11, and 1-12) were prepared and assessed.

<<Sample Preparation>>

Sample No. 1-1

As starting powders, titanium oxide powder (average particle size=0.18 µm; purity=more than 98%) and amorphous carbon powder (average particle size=0.18 µm; purity=more than 98%) were provided (providing step). The average particle sizes of the starting powders were determined by the FSSS method. The titanium oxide powder and the carbon powder were blended in a mass ratio of 4:1 and were mixed without pulverization in a Henschel mixer to obtain a mixed powder (mixing step). The mixing conditions were as follows: rotational speed=1,500 rpm; mixing time=1 hour; dry airflow mixing. The resulting mixed powder was blended with dextrin as a binder and was granulated and sized into pellets with a diameter of about 2 mm and a length of 2 to 5 mm, followed by drying at a temperature of 150° C. to obtain a granulated powder (granulation step). The resulting granulated powder was heated in a nitrogen stream (1 atm) at a heat treatment temperature of 2,200° C. for a heat treatment time of 1 hour to obtain a pelletized titanium carbonitride powder (heat treatment step). The heating rate from room temperature to 2,200° C. was 20° C./min, and the cooling rate from 2,200° C. to room temperature was 20° C./min. The pelletized titanium carbonitride powder was then disintegrated in a mortar by hand to obtain a particulate titanium carbonitride powder (de-agglomeration step).

Sample Nos. 1-2, 1-3, and 1-11

Titanium carbonitride powders were prepared with varying heat treatment temperatures in the heat treatment step. The heat treatment temperature was as follows: 2,000° C. for Sample No. 1-2; 2,300° C. for Sample No. 1-3; 1,700° C. for Sample No. 1-11. The conditions other than the heat treatment temperature were identical to those for Sample No. 1.

Sample No. 1-4

A titanium carbonitride powder was prepared with a heat treatment time of 0 hour in the heat treatment step. That is, in the heat treatment step of Sample No. 4, heating from room temperature to 2,200° C. at a heating rate of 20° C./min was immediately followed by cooling to room temperature at a cooling rate of 20° C./min. The conditions other than the heat treatment time were identical to those for Sample No. 1.

Sample No. 1-5

A titanium carbonitride powder was prepared by mixing the titanium oxide powder and the carbon powder with tungsten powder and cobalt powder as impurities, each in an amount of 0.5% by mass on a titanium carbonitride basis, in the mixing step. The other conditions were identical to those for Sample No. 1.

Sample No. 1-12

As a comparative product, a titanium carbonitride powder was prepared by the method of manufacture disclosed in PTL 1. Specifically, as starting powders, titanium hydride (average particle size=0.18 µm; purity=98%) and carbon powder (average particle size=0.18 µm; purity=98%) were provided. In addition, tungsten carbide powder and cobalt powder were provided such that the $TiC_{0.5}N_{0.5}$ powder obtained after the heat treatment step had a tungsten content of 0.8% by mass and a cobalt content of 0.3% by mass based on a $TiC_{0.5}N_{0.5}$ basis. These powders were mixed and pulverized in a ball mill, and the mixed powder was heat-treated in a nitrogen-containing atmosphere at 1,600° C. for 1.0 hour, followed by pulverization to 1.2 µM.

<<Measurement of Particle Size Distribution>>

Figure 2:
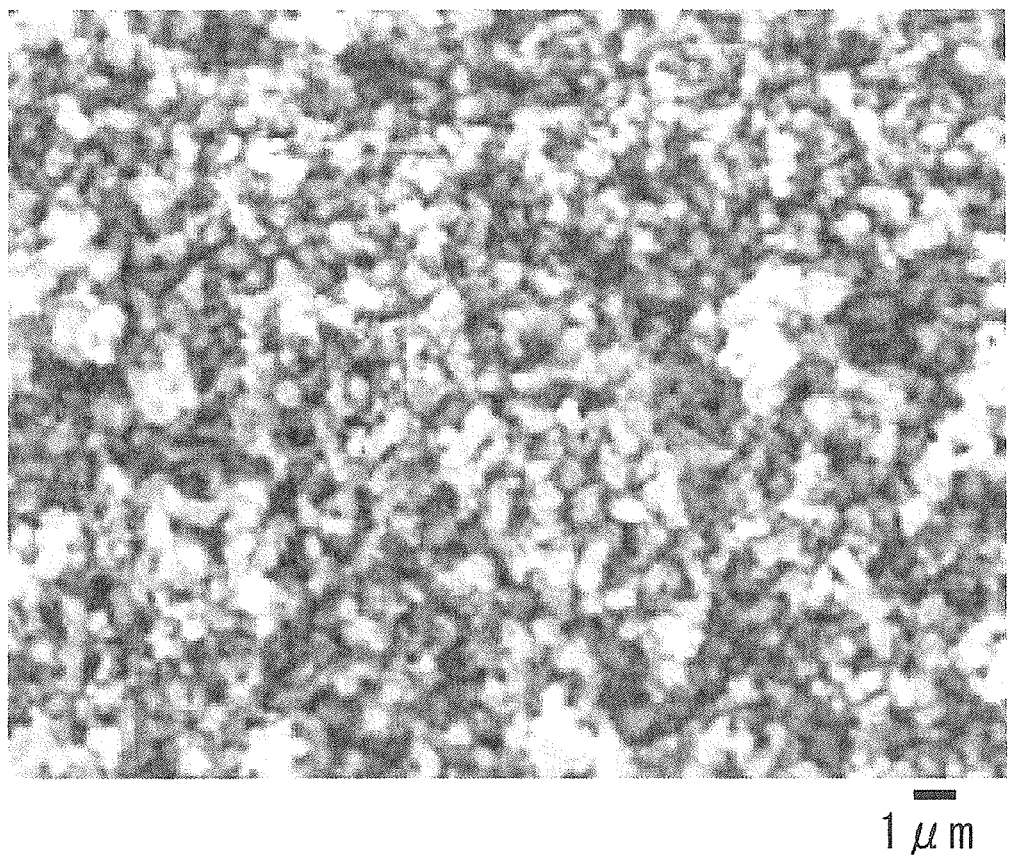
FIG. 2 is a field-emission scanning electron micrograph of a titanium carbonitride powder of Sample No. 1-11 in Test Example 1.
Figure 3:
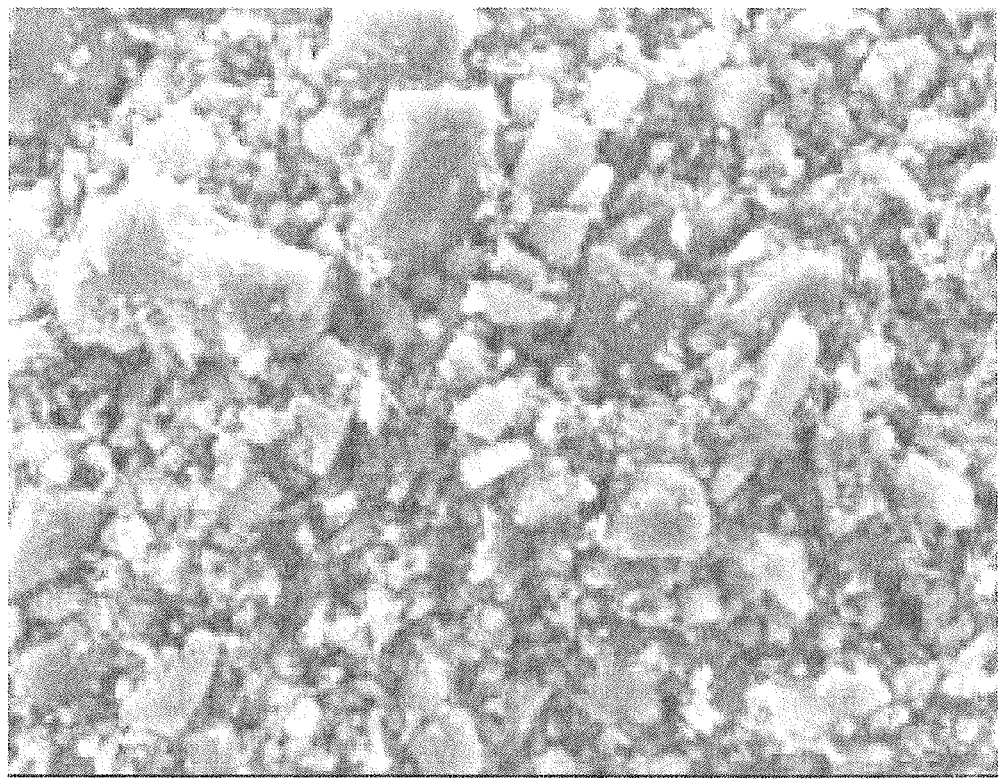
FIG. 3 is a field-emission scanning electron micrograph of a titanium carbonitride powder of Sample No. 1-12 in Test Example 1.

The particle size distribution by volume of each resulting sample titanium carbonitride powder was measured with a laser diffraction/scattering particle size distribution analyzer (Microtrac, manufactured by MicrotracBEL Corp.). The measurement conditions were as follows: wet measurement (solvent: ethanol); refractive index of solvent=1.36; refractive index of particles=2.4. Table 1 shows the particle size D10 at a cumulative percentage of 10%, the particle size D50 at a cumulative percentage of 50%, the particle size D90 at a cumulative percentage of 90%, and the calculated D10/D90 of the resulting particle size distribution. FIGS. 1 to 3 show photographs of the resulting titanium carbonitride powders of Sample Nos. 1-1, 1-11, and 1-12 captured under a field-emission scanning electron microscope (FE-SEM, 5,000× magnification).

<<Measurement of Full Width at Half Maximum of Diffraction Peak>>

The full widths at half maximum of the X-ray diffraction peaks of the (2,0,0), (2,2,0), and (2,2,2) planes of each resulting sample titanium carbonitride powder were measured with Cu Kα X-rays. The results are also shown in Table 1.

<<Measurement of Number of Pores in Particles>>

Figure 4:
FIG. 4 is a field-emission transmission electron micrograph of a titanium carbonitride particle forming the titanium carbonitride powder of Sample No. 1-1 in Test Example 1.
Figure 5:
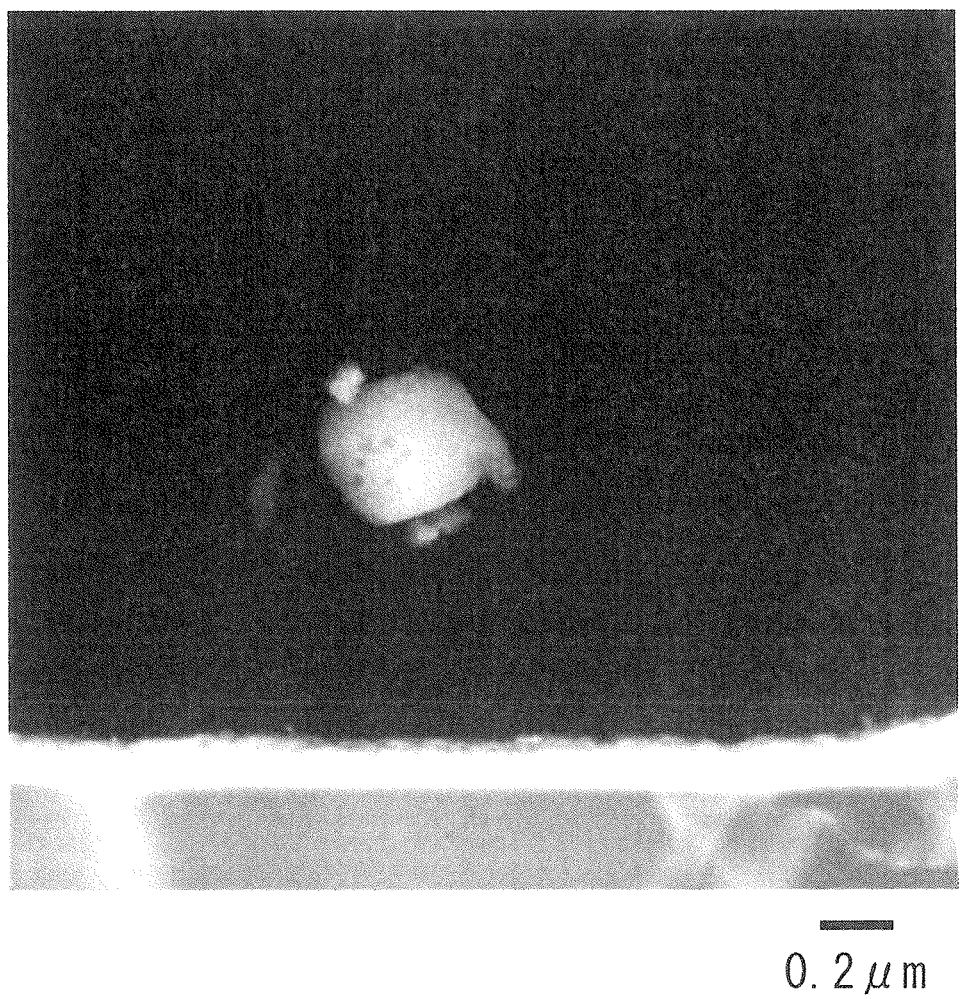
FIG. 5 is a field-emission transmission electron micrograph of a titanium carbonitride particle forming the titanium carbonitride powder of Sample No. 1-11 in Test Example 1.

In addition, a teste specimen was prepared by binding each resulting sample titanium carbonitride powder with resin and was ion-polished with an ion slicer (IB-09060CIS, manufactured by JEOL Ltd.). The resulting cross-section was observed under a field-emission transmission electron microscope (FE-TEM, 50,000× magnification). In this example, the measurement was performed on a total of three or more titanium carbonitride particles in three observation fields of view taken from the cross-section, each field of view having an area of from 4 μm² to 8 μm². The results are also shown in Table 1. Here, the largest number of pores present in titanium carbonitride particles containing pores is shown. FIGS. 4 and 5 show photographs of titanium carbonitride particles forming the resulting titanium carbonitride powders of Sample Nos. 1-1 and 1-11 captured under a field-emission transmission electron microscope (FE-TEM, 50,000× magnification).

treatment temperature, i.e., 1,700° C., tends to result in the formation of pores in titanium carbonitride particles. For Sample No. 1-11, there were pores in most of the titanium carbonitride particles. Sample No. 1-12, which was prepared by mixing and pulverizing the starting powders in a ball mill, heat-treating the mixed powder at a temperature of 1,600° C., and then pulverizing the powder, satisfied (A) a D50 of from 2.0 μm to 6.0 μM, but had (B) a D10/D90 of less than 0.20. Sample No. 1-12 was (B) not uniformly sized because this sample failed to maintain the particle size of the starting powders and became fine since pulverization was performed in the mixing step and also after heat treatment (see also FIG. 3). In addition, there were many pores in the titanium carbonitride particles of Sample No. 1-12. This is because a low heat treatment temperature, i.e., 1,600° C., tends to result in the formation of pores in titanium carbonitride particles. For Sample No. 1-12, there were pores in most of the titanium carbonitride particles, and they contained 4 to 12 pores.

Test Example 2

In Test Example 2, hard materials (Sample Nos. 2-1 to 2-5, 2-11, and 2-12) were prepared from the sample titanium carbonitride powders obtained in Test Example 1 and were assessed.

<<Sample Preparation>>

As starting powders, the sample titanium carbonitride powders obtained in Test Example 1 were provided (Sample Nos. 1-1 to 1-5, 1-11, and 1-12 were used for Sample Nos.

TABLE 1

| Sample No. | D10 | D50 | D90 | D10/D90 | Full width at half maximum (°) | | | Number of pores |
| | | | | | (2, 0, 0) plane | (2, 2, 0) plane | (2, 2, 2) plane | |
| --- | --- | --- | --- | --- | --- | --- | --- | --- |
| 1-1 | 1.48 | 2.66 | 5.43 | 0.27 | 0.09 | 0.09 | 0.11 | 0 |
| 1-2 | 1.23 | 2.15 | 5.02 | 0.25 | 0.18 | 0.17 | 0.17 | 1 |
| 1-3 | 1.63 | 3.01 | 7.18 | 0.23 | 0.16 | 0.13 | 0.14 | 0 |
| 1-4 | 1.37 | 2.44 | 5.35 | 0.26 | 0.08 | 0.08 | 0.09 | 2 |
| 1-5 | 1.48 | 2.80 | 6.65 | 0.22 | 0.38 | 0.55 | 0.59 | 4 |
| 1-11 | 0.54 | 0.84 | 1.64 | 0.33 | 0.14 | 0.13 | 0.15 | 8 |
| 1-12 | 0.81 | 2.28 | 7.34 | 0.11 | 0.36 | 0.73 | 0.98 | 12 |

As can be seen from Table 1, Sample Nos. 1-1 to 1-5, which were prepared by mixing titanium oxide powder and carbon powder without pulverization, granulating the mixed powder, and heat-treating the granulated powder at a temperature of from higher than 2,000° C. to 2,500° C. in a nitrogen-containing atmosphere, satisfied (A) a D50 of from 2.0 μm to 6.0 μm and (B) a D10/D90 of from 0.20 to 0.50. That is, Sample Nos. 1-1 to 1-5 were (A) coarse and (B) uniformly sized (see also FIG. 1). In addition, there were few pores in the titanium carbonitride particles of Sample Nos. 1-1 to 1-5. In contrast, Sample No. 1-11, which was prepared by heat treatment at a temperature of 1,700° C., satisfied (B) a D10/D90 of from 0.20 to 0.50, but had (A) a D50 of less than 2.0 μm. Sample No. 1-11 was (B) uniformly sized because the heat treatment step was performed while the particle size of the starting powders was maintained since mixing was performed without pulverization in the mixing step; however, this sample was (A) fine because the heat treatment step was performed at low temperature and thus failed to promote grain growth (see also FIG. 2). In addition, there were many pores in the titanium carbonitride particles of Sample No. 1-11. This is because a low heat 2-1 to 2-5, 2-11, and 2-12, respectively), and a commercially available WC powder (average particle size=1.0 μm), TaC powder (average particle size=0.7 μm), Co powder (average particle size=1.0 μm), and Ni powder (average particle size=1.5 μm) were also provided (providing step). The average particle sizes of the starting powders were determined by the FSSS method. These powders were blended in a ratio of TiCN-20WC-7TaC-8Co-8Ni and were mixed in a ball mill to obtain mixed powders (mixing step). Mixing was performed using water as a solvent and cemented carbide balls with a diameter of 5 mm as a media. The mixing time was as follows: 12 hours for Sample Nos. 2-1 to 2-5 and 2-11; 120 hours for Sample No. 2-12. The resulting mixed powders were press-compacted at 98 MPa to obtain compacts (compaction step). The resulting compacts were sintered in a vacuum atmosphere at 1,550° C. for 0.5 hours to obtain hard materials (sintering step).

<<Structure Observation>>

After the resulting sample hard materials were cut with a diamond blade, the cut surfaces were ground flat and mirror-finished with a #3000 diamond paste. An image of the structure of any cross-section of each observation sample was captured with a field-emission scanning electron microscope (FE-SEM) at 5,000× magnification under the following conditions: acceleration voltage=15 kV; operating distance=10.0 mm. As representative examples, FIGS. 6 to 8 show the photographs of the hard materials of Sample Nos. 2-1, 2-11, and 2-12.

Figure 6:
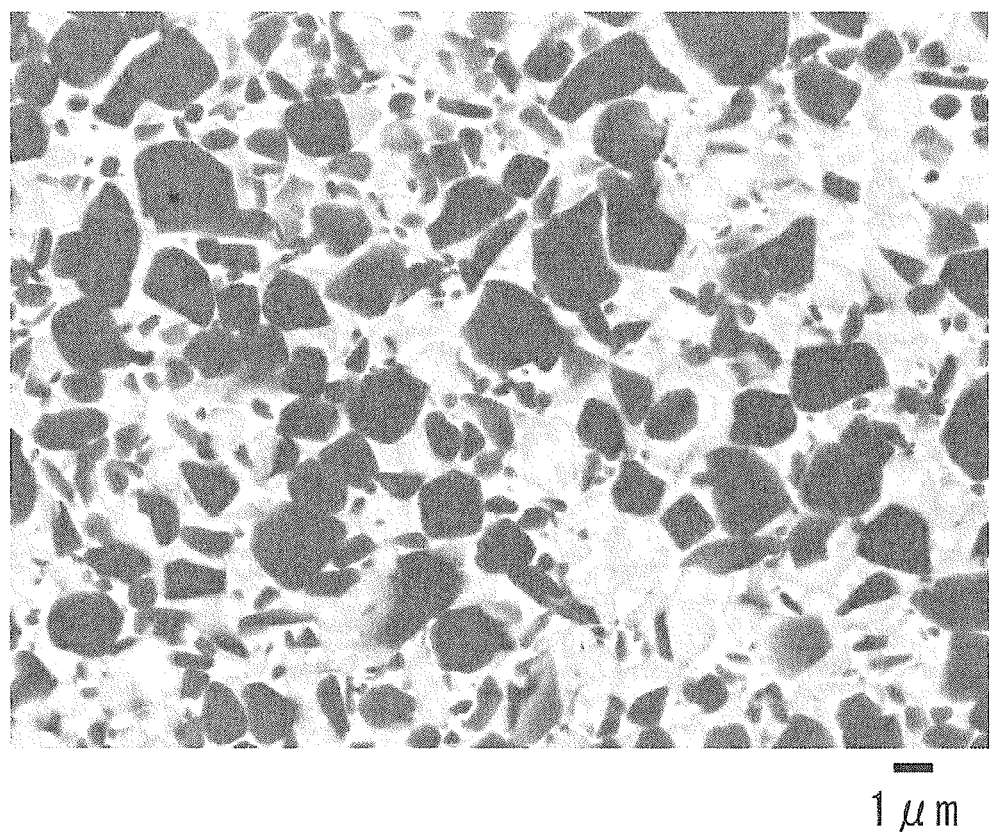
FIG. 6 is a field-emission scanning electron micrograph of a cross-section of a hard material of Sample No. 2-1 in Test Example 2.
Figure 7:
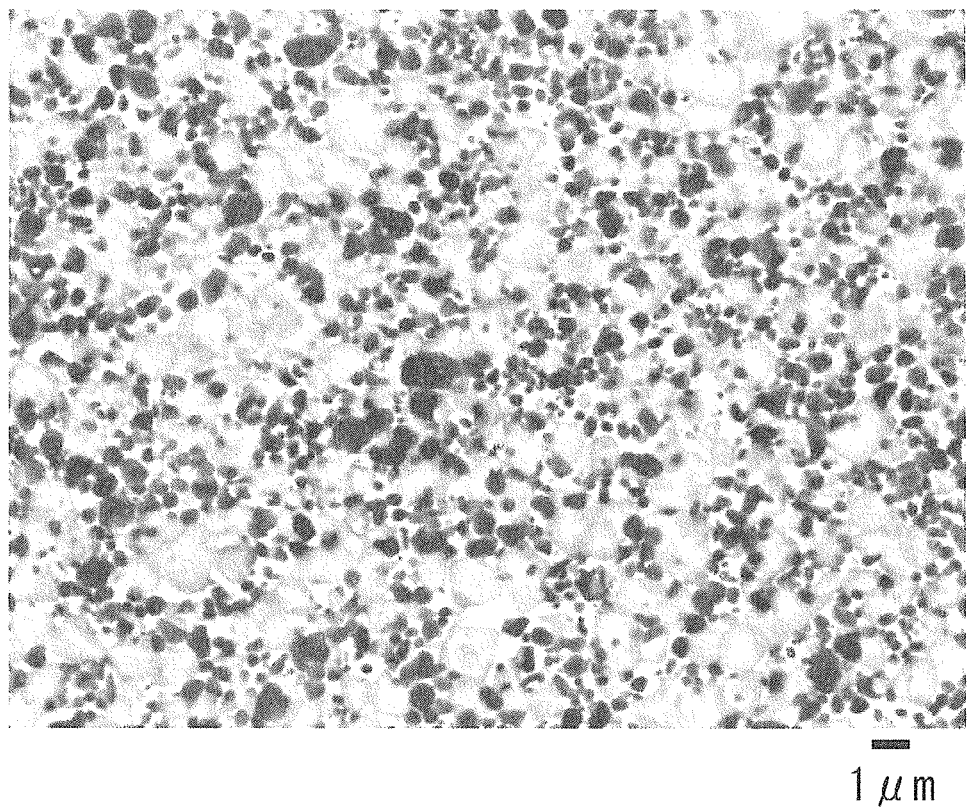
FIG. 7 is a field-emission scanning electron micrograph of a cross-section of a hard material of Sample No. 2-11 in Test Example 2.
Figure 8:
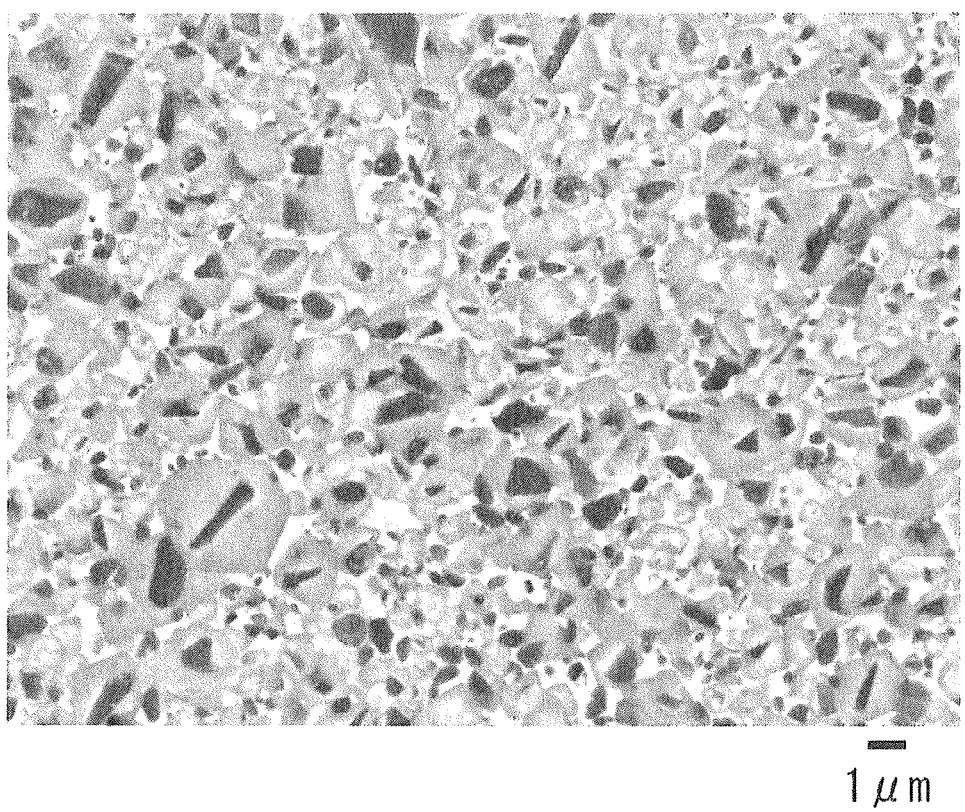
FIG. 8 is a field-emission scanning electron micrograph of a cross-section of a hard material of Sample No. 2-12 in Test Example 2.

In FIGS. 6 to 8, the black area indicates a first hard phase containing titanium carbonitride as a major constituent, the gray area indicates a second hard phase containing WC and TaC as major constituents, and the white area therebetween indicates a binder phase containing Co and Ni as major constituents. As can be seen from FIG. 6, the first hard phase was coarse and uniformly sized. In contrast, the first hard phase in FIG. 7 was fine, and the first hard phase in FIG. 8 was fine and had variations in particle size.

<<Mechanical Properties>>

The Vickers hardness (GPa), the fracture toughness (MPa·m$^{0.5}$), and the bending strength (GPa) of the machined surfaces were measured in accordance with JIS Z 2244 (2009), JIS R 1607 (1995), and the Japan Cemented Carbide Tool Manufacturer's Association standard CIS026B-2007, respectively. The results are shown in Table 2.

The thermal diffusivity, the specific heat, and the specific gravity of the hard materials at room temperature (20° C. to 22° C.) were also measured with a thermal diffusivity analyzer (LFA457 manufactured by Netzsch, Inc.), with a specific heat analyzer (STA449 manufactured by Netzsch, Inc.), and by Archimedes' method, respectively. These measurements were multiplied to determine the thermal conductivity (W/mK). Sapphire was used as a reference sample for specific heat measurement with an STA449. The results are also shown in Table 2.

TABLE 2

| Sample No. | Hardness (GPa) | Fracture toughness (MPa · m$^{0.5}$) | Bending strength (GPa) | Thermal conductivity W/mK |
|---|---|---|---|---|
| 2-1 | 13.4 | 7.2 | 2.3 | 20.0 |
| 2-2 | 13.7 | 6.8 | 2.1 | 19.8 |
| 2-3 | 13.2 | 7.5 | 2.4 | 21.2 |
| 2-4 | 13.6 | 7.0 | 2.1 | 20.2 |
| 2-5 | 13.2 | 7.1 | 2.0 | 18.6 |
| 2-11 | 14.3 | 6.4 | 1.9 | 17.2 |
| 2-12 | 14.2 | 6.3 | 2.0 | 14.5 |

As can be seen from Table 2, Sample Nos. 2-1 to 2-5, which were obtained using a coarse and uniformly sized titanium carbonitride powder as a starting powder, had a fracture toughness of 6.8 MPa·m$^{0.5}$ or more and a thermal conductivity of 18 W/m or more, indicating that both the fracture toughness and the thermal conductivity improved as compared to Sample Nos. 2-11 and 2-12, which were obtained from a fine titanium carbonitride powder. The hardness decreased as the titanium carbonitride powder became coarser. This is probably because, whereas the use of coarse titanium carbonitride powders allowed the formation of a coarse hard phase and thus improved the fracture toughness by a crack-propagation inhibiting effect (crack deflection effect), the hardness, which is a physical property that is in trade-off with fracture toughness, decreased.

The invention claimed is:

1. A titanium carbonitride powder for use as a starting material for a hard material, the titanium carbonitride powder satisfying:
    a D50 of from 2.0 μm to 6.0 μm; and
    a D10/D90 of from 0.20 to 0.50,
    wherein D50 is a particle size at a cumulative percentage of 50% of a particle size distribution by volume, D10 is a particle size at a cumulative percentage of 10% of the particle size distribution by volume, and D90 is a particle size at a cumulative percentage of 90% of the particle size distribution by volume, and
    wherein all X-ray diffraction peaks of (2,0,0), (2,2,0), and (2,2,2) planes as measured with Cu Kα X-rays have a full width at half maximum of from 0.03° to 0.20°.

2. The titanium carbonitride powder according to claim 1, wherein the titanium carbonitride powder satisfies a D50 of from 2.5 μm to 3.5 μm.

3. The titanium carbonitride powder according to claim 1, wherein each titanium carbonitride particle forming the titanium carbonitride powder contains two or fewer pores.

4. A method for manufacturing the titanium carbonitride powder according to claim 1, comprising:
    a providing step of providing starting powders including titanium oxide powder and carbon powder;
    a mixing step of mixing the starting powders without pulverization to obtain a mixed powder; and
    a heat treatment step of heating the mixed powder in a nitrogen-containing atmosphere at a temperature of from higher than 2,000° C. to 2,500° C. to obtain a titanium carbonitride powder.

5. The method for manufacturing a titanium carbonitride powder according to claim 4, wherein
    the method comprises, after the mixing step and before the heat treatment step, a granulation step of granulating and sizing the mixed powder to obtain a granulated powder,
    in the heat treatment step, the granulated powder is heated to obtain a granulated powder of titanium carbonitride, and
    the method further comprises a de-agglomeration step of disintegrating the granulated powder of titanium carbonitride.

* * * * *